United States Patent [19]
Rasche

[11] Patent Number: 5,597,430
[45] Date of Patent: Jan. 28, 1997

[54] PROCESS AND APPARATUS FOR MANUFACTURING A BODY REINFORCED WITH FIBER-COMPOSITE MATERIAL

[75] Inventor: Christian Rasche, Bochum, Germany

[73] Assignee: Mannesmann Aktiengesellschaft, Düsseldorf, Germany

[21] Appl. No.: 401,259

[22] Filed: Mar. 9, 1995

[30] Foreign Application Priority Data

Mar. 9, 1994 [DE] Germany ................... 44 08 637.7

[51] Int. Cl.$^6$ .................................. B65H 81/00
[52] U.S. Cl. ............... 156/161; 156/169; 156/173; 156/175; 156/244.12; 156/425; 156/441; 156/500; 156/583.5; 264/171.23; 264/171.29; 264/136
[58] Field of Search ..................... 156/169, 173, 156/175, 172, 244.12, 161, 164, 425, 500, 583.5, 433, 441; 264/171.23, 171.29, 136

[56] References Cited

U.S. PATENT DOCUMENTS

| | | | |
|---|---|---|---|
| 2,960,425 | 11/1960 | Sherman | 264/171.29 X |
| 3,526,000 | 8/1970 | Williams . | |
| 4,010,054 | 3/1977 | Bradt . | |
| 4,514,245 | 4/1985 | Chabrier | 156/161 |
| 4,720,366 | 1/1988 | Binnersley et al. | 264/171.23 |
| 4,804,509 | 2/1989 | Angell, Jr. et al. | 264/136 |

FOREIGN PATENT DOCUMENTS

| | | | |
|---|---|---|---|
| 0291267 | 11/1988 | European Pat. Off. | 156/164 |
| 70.45150 | 7/1972 | France . | |
| 1957276 | 4/1973 | Germany . | |

OTHER PUBLICATIONS

Muzzy, J. D., "Processing of Advanced Thermoplastic Composites," ASME Symposium of Manufacturing Science of Composites, Apr. 1988, pp. 27–39.

*Primary Examiner*—Jeff H. Aftergut
*Attorney, Agent, or Firm*—Cohen, Pontani, Lieberman, Pavane

[57] ABSTRACT

The invention relates to a process and apparatus for manufacturing a body to be reinforced with a fiber-composite material, especially bottles or containers or metal or plastic for holding a pressurized gaseous medium, in which a plurality of light, high-strength inorganic or organic, non-conductive or conductive as well as non-metallic yarns are wrapped around the body, whereby individual fiber strands or fibers are unwound and are bundled and, prior to being wound on the body, are impregnated with a plastic material. The wrapping of the yarns is carried out with controllable, pre-tensioned yarns. During wrapping, the individual yarns are again impregnated with a polymer melt of thermoplastic and each individual wrapping layer is smoothed and/or cooled by a temperature-controlled roller.

21 Claims, 3 Drawing Sheets

PROCESS AND APPARATUS FOR MANUFACTURING A BODY REINFORCED WITH FIBER-COMPOSITE MATERIAL

BACKGROUND OF THE INVENTION

1. Field of the Invention

The present invention relates to a process and an apparatus for manufacturing a body reinforced with fiber-composite material, for example, a glass, metal or plastic container for holding pressurized gas.

2. Description of the Related Art

A process of manufacturing a body reinforced with fiber composite is known from U.S. Pat. No. 4,559,974. In this process, a plurality of light weight, high-strength, inorganic, nonconductive and non-metallic yarns are wrapped lengthwise around a hollow body. A plurality of spools are arranged on a spool holder. The yarns from the spools are bundled together and, prior to wrapping them around the body which should be reinforced, they are impregnated with a resin. This process uses a duromer resin as a matrix of the fiber-composite material, not a thermoplastic. The disadvantages resulting from this process are inferior recyclability, longer processing time, limited shelf-life of the raw material, greater moisture absorption, lower temperature stability and less ductile yield.

EP OS 0060856 discloses the so-called spiflex process. In this process, a fiber-reinforced thermoplastic strip is prepared first. This strip is tensioned and then wrapped around the hollow body to be reinforced. The main disadvantage of this process is that the manufacturing of the strip entails additional costs and, thus, for economic reasons, the spiflex process has disadvantages, even though it uses the preferred thermoplastic as a matrix material. Another disadvantage is that, due to the width of the strip material, the application is limited to certain body forms.

SUMMARY OF THE INVENTION

The object of the present invention is to provide a process and apparatus for reinforcing with a fiber composite material a hollow body, for example, a container made of glass, metal or plastic, capable of holding pressurized gas. Another object is to provide a method and apparatus for reinforcing a body with fiber-composite material which is more cost-effective than the spiflex process. Yet another object is to provide a method and apparatus which offers a wider range of possible applications.

In accordance with the present invention, a process and apparatus for manufacturing a body reinforced with a fiber-composite material is disclosed, wherein the strands of fiber (yarns or rovings) are wrapped around a body while the strands are under controlled tension. This is achieved by guiding several strands of yarn, bundled together, over an assembly of multiple tensioning rollers.

This roller assembly can be slowed down by suitable known means, for example by using electric motors. Controlling the speed of the rollers allows control of the tension of the fiber strands or yarns guided along the rollers. This tension control is maintained during wrapping of the yarns onto a body. Instead of impregnating the yarns with a duromer (resin), the present invention uses an extruder dispensing a polymer melt. The extruder follows the yarns while the body is wrapped with the yarns and dispenses the polymer melt onto the body. The yarns are then drawn through the polymer melt. In addition and to achieve an even better impregnation of the yarns, the polymer melt is also spread over the surface of the yarns. Also, the previously bundled yarns can be spread apart again immediately prior to wrapping them onto the body, to better cover the yarns' surfaces with the thermoplastic.

To even further improve the impregnation of the yarns and, thus the reinforcement of the body, a second extruder is provided which dispenses more thermoplastic melt onto the wrapping of the yarns on the body. The wrapping now forms a layer of fiber yarns on the body. To smooth out any possible unevenness created by forming the layer, a smoothing roller is provided which can also be temperature controlled by heating or cooling the roller.

The advantage of the present invention is that costs incurred for producing a wrapping strip are eliminated while the advantages of thermoplastics as the matrix material are still utilized. Furthermore, using yarns or fiber strands which are placed under controlled tension prior to wrapping, results in less overall tension on the body to be wrapped, considering various elasticity moduli of the body and fiber-composite material. Another contributing factor in reducing the overall tension on the body is that thermally-induced tensions are reduced during the cooling of the polymer melt.

This invention also contemplates using a heatable or temperature-controlled dual-belt press instead of an extruder. In this embodiment, the yarns are tensioned in the same way they are tensioned in the embodiment described above. However, after the bundled yarns are spread apart, they are fed through the dual-belt press together with two thermoplastic bands or films which are dispensed from individual dispenser rollers. While passing through the heated press, the films or bands soften or even liquify. This causes a thorough impregnation of the yarns. After leaving the dual-belt press, the yarns are wrapped onto the body to be reinforced, also utilizing a smoothing roller.

In order to even more economically utilize the invention, the wrapping assembly can include wrapping several bodies simultaneously.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, where like numerals delineate similar elements through the several views.

DESCRIPTION OF THE PREFERRED EMBODIMENTS

Figure 1:
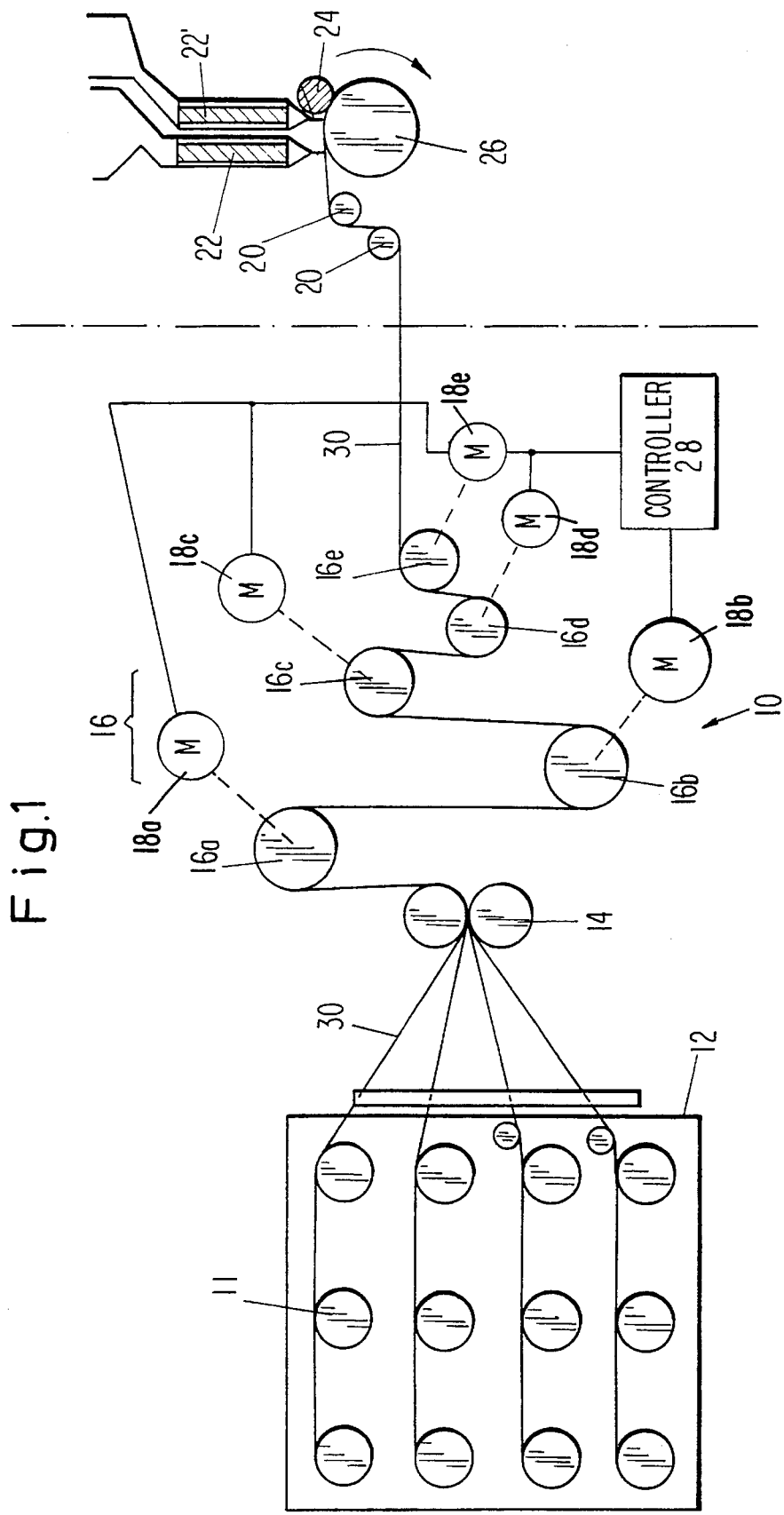
FIG. 1 illustrates a schematic view, looking from the side of an apparatus used in the process according to the invention.
Figure 2:
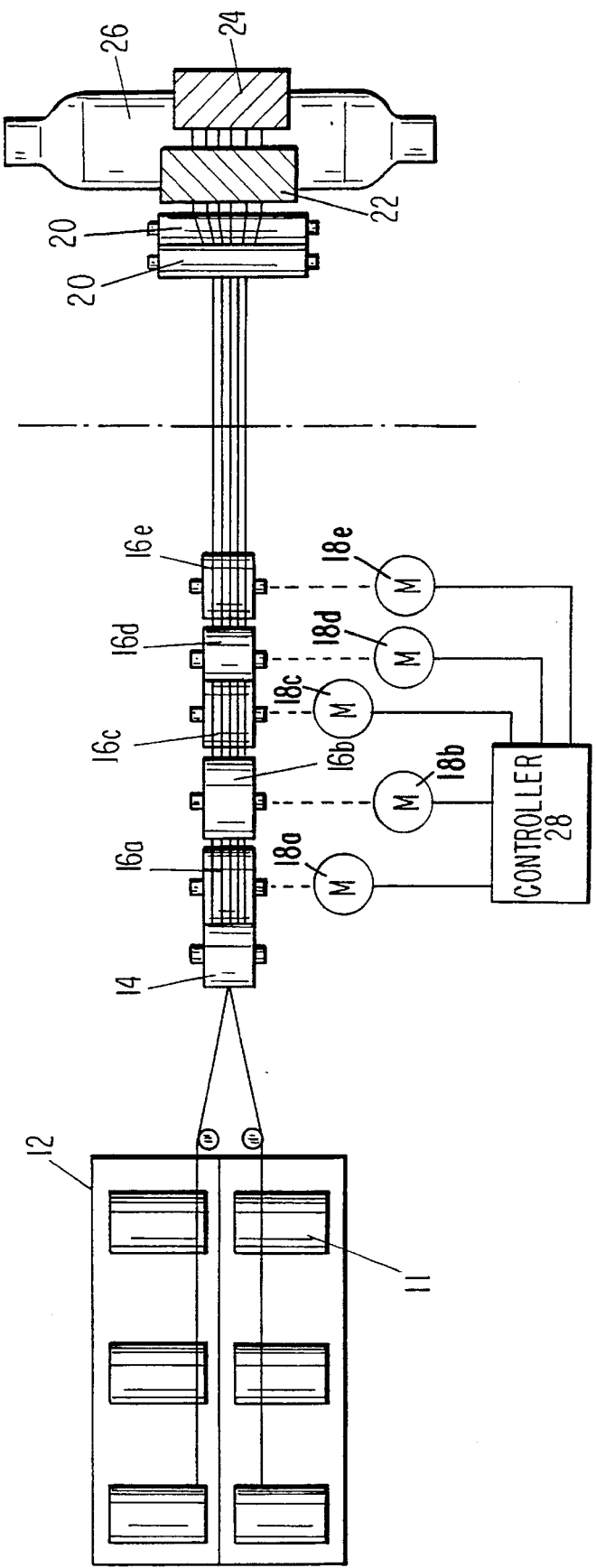
FIG. 2 illustrates a top view of the apparatus of FIG. 1.

Referring now to FIGS. 1 and 2 in detail, it is shown that the wrapping assembly 10 includes a spool assembly 12, a roller combination 14 for bundling the yarns, an assembly 16 of deflection rollers 16a–16e for tensioning the yarns in advance of their being wrapped, a spreader 20, two extruders, 22 and 22', a smoothing roller 24 and a body 26 to be reinforced. The spool assembly 12 includes an array of spools 11 of yarns or fibers 30, each yarn being carried by a separate spool. The yarns are pulled from the spools along paths to the body 26 to be reinforced. Along the paths, the yarns are guided through the roller combination for bundling 14. The bundled strands of yarns run through the assembly of deflection rollers 16, where the yarns 30 are tensioned in preparation for wrapping. In accordance with the present invention, the tensioning is achieved by controlling the speed of the deflection rollers. Speed control may be performed in any well known manner as by controlling motors 18a–18e associated with the rollers through a motor controller 28. The tensioning is based on the principle of rope friction according to the Euler-Eytelwein formula of $F_1 = F_2 \times e^{M\alpha}$, wherein M=friction factor and α=contact angle.

The tensioned bundle of yarns 30 now enters the spreader 20, where the yarns are separated in order to provide more surface area for the thermoplastic melt which extrudes from the first extruder 22 onto the surface of the yarns and the body.

For an improved impregnation of the yarns and, thus for an improved reinforcement of the body, the second extruder 22' dispenses more thermoplastic melt onto the yarn while it is being wrapped around the body. The wrapping forms one or more layers of fiber yarns on the body. To smoothen out any possible unevenness in the thermoplastic melt and to consolidate the impregnated yarns, a smoothing roller 24 is provided which is preferably temperature controlled, it may supply heat or cooling to the body to be reinforced.

Figure 3:
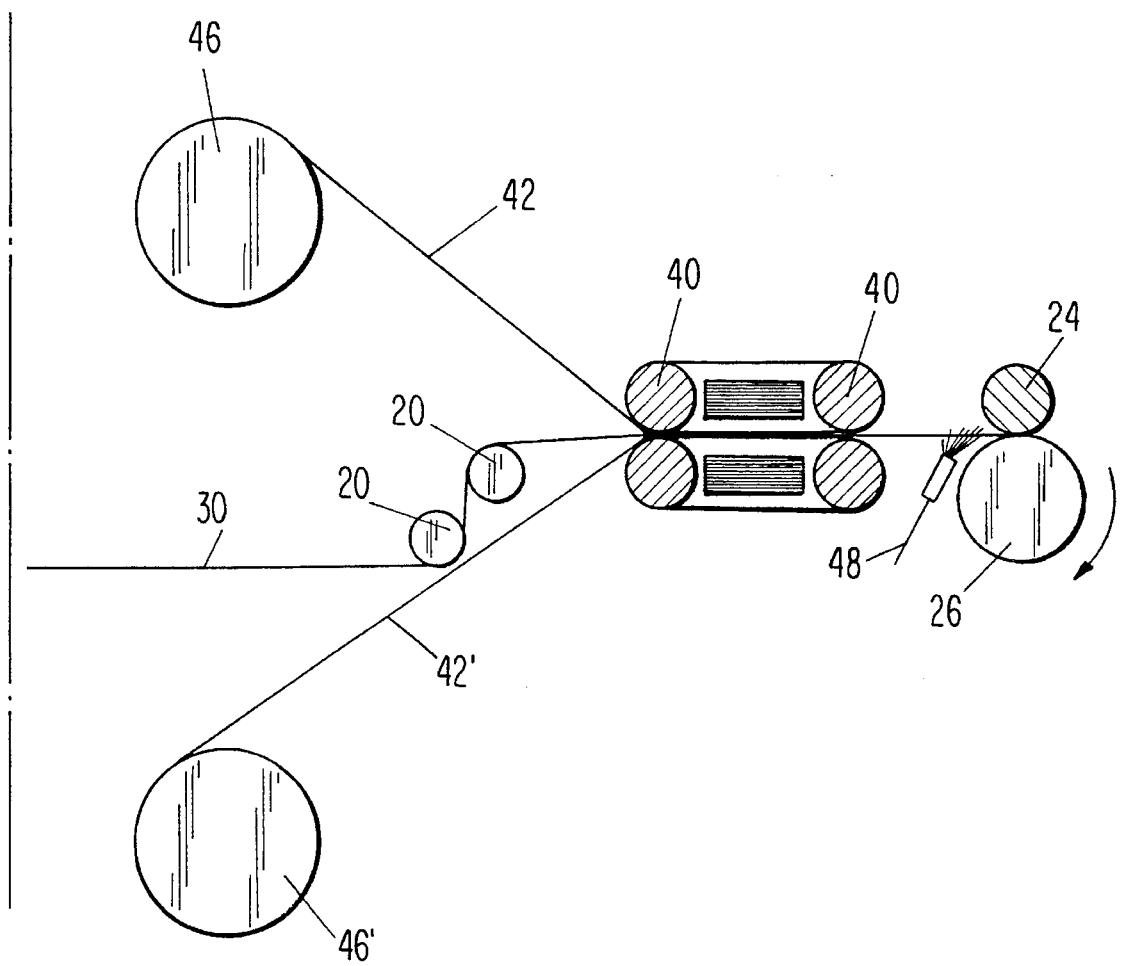
FIG. 3 illustrates a side schematic view of another embodiment of the apparatus used in the process according to the invention.

Referring now to FIG. 3, a side schematic view of a portion of another embodiment of the apparatus is shown to the right of the dot dash line—in FIG. 3, the apparatus is constructed and operates the same as the portion of the apparatus of the apparatus of FIG. 1 to the right of the dot dash line—therein. In this wrapping assembly, a temperature controllable dual-belt press 40 is used instead of an extruder or extruders. In this assembly, as already noted, the yarns are tensioned in the same way they are tensioned in the assembly 10 described above. However, after the tensioned bundled yarns are spread apart by the spreader 20 (see FIG. 1), they are fed through the dual-belt press 40 together with two thermoplastic bands or films 42 and 42' which are dispensed from individual dispensers 46 and 46' preferably to both overlay and underlie the yarns in order to improve impregnation. While passing the films or bands through the heated press 40, they liquify and soften. This causes a thorough impregnation of the yarns. After leaving the dual-belt press 40, the yarns are wrapped onto the body 26 to be reinforced. The thus resulting layer is also subjected to a smoothing roller 24 in much the same manner as in the FIG. 1 embodiment.

If the heat of the dual-belt press is insufficient to melt the thermoplastic films to the desired degree, an auxiliary heater 48 might be employed for further melting. The auxiliary heater 48, which is located adjacent to the body to be wrapped for reinforcement, may be a gas burner, although electric heaters and other suitable heating means may be employed. The additional heating ensures that the impregnation is maintained at an optimum temperature.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A process for manufacturing a body suitable for holding gas under pressure, reinforced with a fiber-composite material, comprising the steps of:

unwinding a plurality of yarns from a plurality of spools;

consolidating the plurality of yarns in a rolling device;

controllably tensioning the plurality of yarns by guiding the yarns along a path including a plurality of controllable tensioning rollers, which tension is controlled by controlling rotational speed of the tensioning rollers;

feeding the controllably tensioned yarns onto the body while maintaining the controlled tension; and dispensing a thermoplastic melt onto the controllably tensioned yarns at a location at which the controllably tensioned yarns are being wrapped around the body to form a layer of fiber-reinforcement of fiber composite material on the body.

2. The process according to claim 1, wherein said feeding step includes feeding the yarns through a spreader.

3. The process according to claim 1, further comprising applying a second thermoplastic melt onto the yarns at a location at which the controllably tensioned yarns are being wrapped around the body, the second thermoplastic melt being applied to a side of the yarns to which the thermoplastic melt is dispensed in said dispensing step.

4. The process according to claim 1, further comprising the step of applying a temperature controlled smoothing roller to the yarns while the yarns are wrapped around the body so that the yarns are consolidated on the body.

5. An apparatus for manufacturing a body reinforced with a fiber-composite material, comprising:

a spool stand providing for a plurality of yarn spools supplying yarns;

a roller combination for consolidating said yarns;

a plurality of tensioning rollers;

a means operatively connected to said plurality of tensioning rollers for controlling rotational speed of said rollers and for controllably tensioning said yarns moving along a path extending between said spool stand and a rotating body to be reinforced;

a dispenser means for supplying a thermoplastic melt, said dispenser means being positioned adjacent the body so that the thermoplastic melt is dispensed onto the yarns while the yarns wrap the body; and a smoothing roller for smoothing the yarns onto the body, said smoothing roller being disposed adjacent the body.

6. An apparatus according to claim 5, wherein said roller combination is located between said spool stand and said tensioning rollers.

7. An apparatus according to claim 5, further comprising a spreader positioned between said tensioning rollers and said rotating body for spreading apart said yarns.

8. An apparatus according to claim 5, wherein said dispensing means is a first extruder.

9. An apparatus according to claim 5, further comprising applying means for dispensing a second thermoplastic melt onto the yarns at a location at which the controllably tensioned yarns are being wrapped around the body, the applying means being disposed adjacent the body so that the second thermoplastic melt is dispensed by the applying means to a side of the yarns to which the thermoplastic melt is dispensed by said dispensing means.

10. An apparatus according to claim 5, wherein the smoothing roller is temperature controlled so that said smoothing roller is operative to consolidate the yarns on the body.

11. The apparatus according to claim 5, wherein the spool stand, the roller combination and the plurality of tensioning rollers are able to move in a direction parallel to an axis about which the body rotates.

12. The apparatus according to claim 9, wherein said applying means comprises an extruder.

13. The process according to claim 1, further comprising the step of at least one of smoothing and cooling the yarns wrapped and the thermoplastic melt dispensed onto the body.

14. A process for manufacturing a body suitable for holding gas under pressure, reinforced with a fiber-composite material, comprising the steps of:

unwinding a plurality of yarns from a plurality of spools;

consolidating the plurality of yarns in a rolling device;

controllably tensioning the plurality of yarns by guiding the yarns along a path including a plurality of controllable tensioning rollers, which tension is controlled by controlling rotational speed of the tensioning rollers;

feeding the controllably tensioned yarns onto the body while maintaining the controlled tension; and applying two heated preformed thermoplastic bands under pressure onto opposed sides of the controllably tensioned yarns at a location prior to a point where the controllably tensioned yarns are wrapped around the body to form a layer of fiber-reinforcement of fiber composite material on the body.

15. The process according to claim 14, further comprising the step of smoothing the yarns wrapped and the thermoplastic bands applied onto the body.

16. The process according to claim 14, further comprising the step of cooling the yarns wrapped and the thermoplastic bands applied onto the body.

17. The process according to claim 15, further comprising the step of cooling the yarns wrapped and the thermoplastic bands applied onto the body.

18. The process according to claim 14, wherein said feeding step includes feeding the yarns through a spreader.

19. An apparatus for manufacturing a body reinforced with a fiber-composite material, comprising:

a spool stand providing for a plurality of yarn spools supplying yarns;

a roller combination for consolidating said yarns;

a plurality of tensioning rollers;

a means operatively connected to said plurality of tensioning rollers for controlling rotational speed of said rollers and for controllably tensioning said yarns moving along a path extending between said spool stand and a rotating body to be reinforced;

a dispenser means for applying two heated preformed thermoplastic bands onto opposed sides of the controllably tensioned yarns at a location prior to a point where the controllably tensioned yarns are wrapped around the body; and a heatable dual belt press for pressing the thermoplastic bands to sandwich the yarns therebetween, said dual belt press being located prior to the point where the controllably tensioned yarns are wrapped around the body.

20. The apparatus according to claim 19, further comprising a smoothing roller positioned to smooth the yarns onto the body.

21. The apparatus according to claim 19, further comprising a heater positioned to heat the thermoplastic bands and the yarns prior to wrapping of the body therewith.

* * * * *